US012472962B2

(12) United States Patent
Broyles et al.

(10) Patent No.: US 12,472,962 B2
(45) Date of Patent: Nov. 18, 2025

(54) SYSTEM AND METHOD FOR TESTING VEHICLE BRAKE AND STEERING SYSTEMS

(71) Applicant: Bendix Commercial Vehicle Systems LLC, Avon, OH (US)

(72) Inventors: Nicholas A. Broyles, North Ridgeville, OH (US); Andrew J. Pilkington, Avon Lake, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 107 days.

(21) Appl. No.: 18/439,806

(22) Filed: Feb. 13, 2024

(65) Prior Publication Data

US 2025/0256729 A1  Aug. 14, 2025

(51) Int. Cl.
| | |
|---|---|
| *B60W 50/04* | (2006.01) |
| *B60W 10/188* | (2012.01) |
| *B60W 10/20* | (2006.01) |
| *B60W 50/02* | (2012.01) |
| *B60W 50/06* | (2006.01) |

(52) U.S. Cl.
CPC .......... *B60W 50/04* (2013.01); *B60W 10/188* (2013.01); *B60W 10/20* (2013.01); *B60W 50/0205* (2013.01); *B60W 50/06* (2013.01); *B60W 2050/043* (2013.01)

(58) Field of Classification Search
CPC .... B60W 50/04; B60W 10/188; B60W 10/20; B60W 50/0205; B60W 50/06; B60W 2050/043
See application file for complete search history.

(56) References Cited

U.S. PATENT DOCUMENTS

| 5,327,781 A | 7/1994 | Moran et al. |
| 6,237,401 B1 * | 5/2001 | Haehn .................. B60T 13/683 |
| | | 73/129 |

(Continued)

FOREIGN PATENT DOCUMENTS

| JP | 5644321 B2 | 12/2014 |
| KR | 20210005394 A | 1/2021 |

OTHER PUBLICATIONS

Bendix Commercial Vehicle Systems LLC, "Service Data SD-25-50062 Steering Assist System," Jul. 2005).

(Continued)

*Primary Examiner* — Naeem Taslim Alam
(74) *Attorney, Agent, or Firm* — Reising Ethington P.C.

(57) ABSTRACT

A system for testing braking and steering systems of a vehicle includes a steering actuator to cause rotation of the steering wheel and electropneumatic modules associated with each wheel brake that include a solenoid controlling fluid communication between a brake actuator of the wheel brake and one of a fluid source and atmosphere. A controller transmits a first control signal to an electropneumatic module associated with a wheel brake on one side of the vehicle to actuate the solenoid of the electropneumatic module. The controller transmits a second control signal to the steering actuator to cause rotation of the steering wheel during actuation of the solenoid of the electropneumatic module and in a rotational direction towards the same side of the vehicle.

20 Claims, 6 Drawing Sheets

(56) References Cited

U.S. PATENT DOCUMENTS

2005/0092532 A1* 5/2005 Johnson ................. B62D 11/08
 180/9.44
2023/0249621 A1* 8/2023 Maeda .................... B60R 11/02
 348/148

OTHER PUBLICATIONS

Bendix Commercial Vehicle Systems LLC, "Technical Bulletin TCH-013-010 Bendix ABS "Chuff" Test Performance," (May 2023).
English (machine) translation of JP 5644321 B2.
English (machine) translation of KR 20210005394 A.

* cited by examiner

SYSTEM AND METHOD FOR TESTING VEHICLE BRAKE AND STEERING SYSTEMS

BACKGROUND OF THE INVENTION a. Field of the Invention

This disclosure relates to a system and method for testing the braking and steering systems in a vehicle. In particular, this disclosure relates to system and method that synchronize testing of the braking and steering systems to increase efficiency of testing and reduce potential confusion of individuals implementing the testing.

b. Background Art

Conventional vehicles will, upon activation of the vehicle, frequently implement tests of various vehicle systems and components to ensure that those systems and components are working properly before the vehicle begins to travel. For example, commercial vehicles such as tractor-trailers frequently test the valves in pneumatic braking systems upon activation of the vehicle by energizing solenoids in the valves. The energization of the solenoids and movement of fluid through the valves produces audible noises in distinct patterns that enable an operator of the vehicle or bystander to evaluate whether the valves are operating properly. The same vehicles will also frequently test the vehicle's steering system by actuating the steering gear to turn the vehicle wheels in each direction. This movement also causes movement of the vehicle steering wheel through which the operator may receive visual or haptic indicators of steering wiggle resulting from damage to one or more steering system components.

Because testing of multiple vehicle systems and components may occur simultaneously, it may be difficult for vehicle operators or other observers to monitor all of the testing and to understand and record the results of each test where the outputs of the tests must be observed by the vehicle operator or other observers. This problem can be addressed by arranging for the tests to occur sequentially, but doing so may create undesirable delays in operating the vehicle.

The inventors herein have recognized a need for a system and method for testing the braking and steering systems in a vehicle that will minimize and/or eliminate one or more of the above-identified deficiencies.

BRIEF SUMMARY OF THE INVENTION

This disclosure relates to a system and method for testing the braking and steering systems in a vehicle. In particular, this disclosure relates to system and method that synchronize testing of the braking and steering systems to increase efficiency of testing and reduce potential confusion of individuals implementing the testing.

One embodiment of a system for testing a braking system and a steering system of a vehicle includes a plurality of electropneumatic modules. Each electropneumatic module is associated with a corresponding brake for a corresponding wheel of the vehicle and includes a solenoid configured to control fluid communication between a brake actuator for the corresponding brake and one of a fluid source and atmosphere. The system further includes a steering actuator configured to cause rotation of a steering wheel of the vehicle. The system further includes a controller configured to transmit a first control signal to a first electropneumatic module of the plurality of electropneumatic modules, the first electropneumatic module associated with a first brake for a first wheel on a first side of the vehicle. The first control signal is configured to actuate the solenoid of the first electropneumatic module. The controller is further configured to transmit a second control signal to the steering actuator. The second control signal is configured to cause rotation of the steering wheel during actuation of the solenoid of the first electropneumatic module in a first rotational direction towards the first side of the vehicle.

One embodiment of an article of manufacture includes a non-transitory computer storage medium having a computer program encoded thereon that when executed by a controller tests a braking system and a steering system of a vehicle. The computer program includes code for transmitting a first control signal to a first electropneumatic module of a plurality of electropneumatic modules on the vehicle. Each electropneumatic module is associated with a corresponding brake for a corresponding wheel of the vehicle and includes a solenoid configured to control fluid communication between a brake actuator of the corresponding brake and one of a fluid source and atmosphere. The first electropneumatic module is associated with a first brake for a first wheel on a first side of the vehicle. The first control signal is configured to actuate the solenoid of the first electropneumatic module. The computer program further includes code for transmitting a second control signal to a steering actuator configured to cause rotation of a steering wheel of the vehicle. The second control signal is configured to cause rotation of the steering wheel during actuation of the solenoid of the first electropneumatic module in a first rotational direction towards the first side of the vehicle.

One embodiment of a method for testing a braking system and a steering system of a vehicle includes transmitting a first control signal to a first electropneumatic module of a plurality of electropneumatic modules on the vehicle. Each electropneumatic module is associated with a corresponding brake for a corresponding wheel of the vehicle and includes a solenoid configured to control fluid communication between a brake actuator of the corresponding brake and one of a fluid source and atmosphere. The first electropneumatic module is associated with a first brake for a first wheel on a first side of the vehicle. The first control signal is configured to actuate the solenoid of the first electropneumatic module. The method further includes transmitting a second control signal to a steering actuator configured to cause rotation of a steering wheel of the vehicle. The second control signal is configured to cause rotation of the steering wheel during actuation of the solenoid of the first electropneumatic module in a first rotational direction towards the first side of the vehicle.

A system and method for testing a braking system and a steering system of a vehicle in accordance with the teachings disclosed herein is advantageous relative to conventional systems and methods. In particular, the system and method disclosed herein synchronize testing of the braking system and steering system in manner that enables the tests to be performed at least partially simultaneously while doing so in manner that makes it easier for an operator of the vehicle to observe the outputs of each test. In this manner, the system and method enable the tests to be performed in an efficient manner that prevents operating delays for the vehicle while ensuring that the results of the tests can be adequately monitored and observed by the vehicle operator or other observers.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
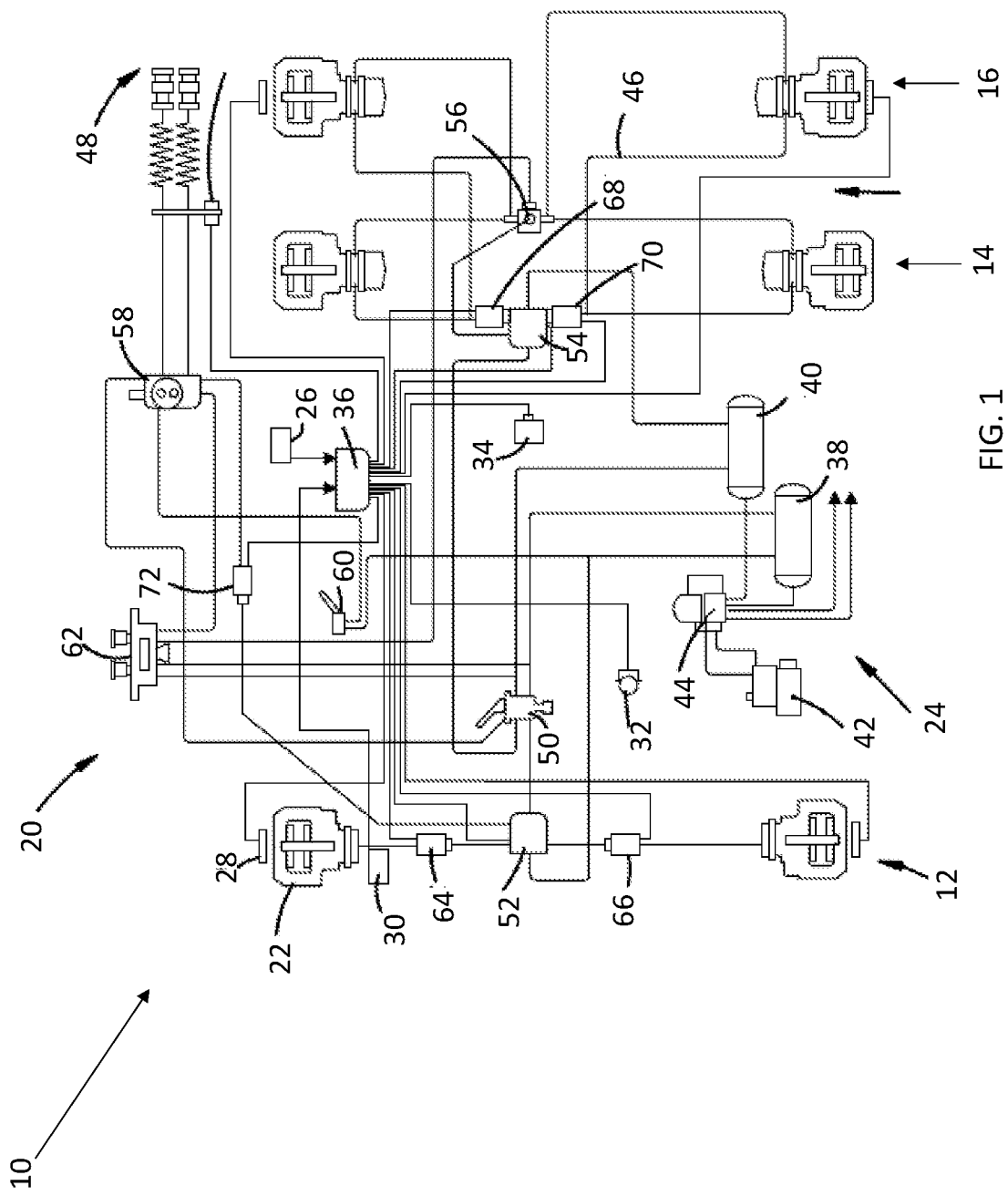
FIG. 1 is a diagrammatic view of a braking system for a vehicle.

Referring now to the drawings wherein like reference numerals are used to identify identical components in the various views, FIG. 1 illustrates a portion of a vehicle 10. In the illustrated embodiment, vehicle 10 comprises a heavy-duty commercial vehicle and, in particular, a tractor or power unit for a tractor-trailer that may be used to tow one or more trailers or towed units. It should be understood, however, that the systems and methods disclosed herein may find application on other types of commercial vehicles including, for example, buses and may also find application on non-commercial vehicles. Vehicle 10 includes a steer axle 12 and tandem drive axles 14, 16 each of which support one or more wheels at either end. Vehicle 10 further includes a power unit (not shown) such as an internal combustion engine or motor for generating mechanical energy used to rotate the wheels. Vehicle 10 may further include a battery (not shown) that provides electrical energy for use by various systems in vehicle 10 including, for example, lighting systems, power windows, locks and seating, and operator interface elements, for use in starting vehicle 10, and for use by the power unit in vehicle 10 in generating the mechanical energy used to drive the wheels.

Vehicle 10 further includes a braking system 20 configured to brake the wheels on vehicle 10 in order to slow or stop movement of vehicle 10. System 20 is configured to brake vehicle 10 in response to commands from an operator of vehicle 10, but may also be configured to implement autonomous braking (i.e., without commands from the operator of vehicle 10) as part of an advanced driver assistance system (ADAS) or automated driving system (ADS) in order to provide various functions such as automated emergency braking (AEB), anti-lock braking (ABS), collision avoidance, adaptive cruise control, traction control or stability control. Braking system 20 may include wheel brakes 22, a fluid circuit 24 that supplies fluid pressure to wheel brakes 22, various sensors 26, 28, 30, 32, 34 that generate signals indicative of operating conditions of vehicle 10 or the operating environment for vehicle 10, and a brake controller 36.

Wheel brakes 22 are configured to apply a braking force to the wheels. In the illustrated embodiment, brakes 22 comprise disc brakes in which a carrier supports brake pads on opposite sides of a rotor rotating with the wheel and an actuator causes, responsive to fluid pressure delivered by fluid circuit 24, movement of a caliper relative to the carrier to move the brake pads into and out of engagement with the rotor. It should be understood, however, that one or more of wheel brakes 22 may alternatively comprise drum brakes in which an actuator such as a cam or piston causes, responsive to fluid pressure delivered by fluid circuit 24, movement of one or more brake shoes into engagement with a braking surface in a brake drum rotating with the wheel.

Fluid circuit 24 generates fluid pressure within braking system 20 and controls the delivery of fluid pressure to the actuator of each wheel brake 22. Circuit 24 may include components for generating and storing pressurized fluid including fluid reservoirs 38, 40, a compressor 42, and air dryer 44 and components for routing and delivering fluid pressure to wheel brakes 22 including fluid conduits 46, glad-hand connectors 48 for routing fluid control signals and fluid pressure to towed units, and various valves and electropneumatic modules including, for example, foot pedal valve 50, relay valves 52, 54, quick release valve 56, tractor protection valve 58, trailer control valve 60, dash control valve 62 and modulators 64, 66, 68, 70, 72. Foot pedal valve 50 allows controlled application of wheel brakes 22 by the vehicle operator by selectively releasing fluid pressure from fluid reservoirs 38, 40 to relay valves 52, 54 and/or tractor protection valve 58. Relay valves 52, 54, increase the volume of fluid, and therefore the speed, at which fluid is delivered to, and exhausted from, wheel brakes 22 in order to eliminate lag times between the commanded and actual application and release of wheel brakes 22. Quick release valve 56 increases the speed at which fluid pressure is exhausted from wheel brakes 22 on the drive axles 16, 18 when the wheel brakes 22 are released. Tractor protection valve 60 transmits pneumatic signals to any towed units in vehicle 10 relating to operation of wheel brakes on the towed units to enable control of the wheel brakes by system 20 and also protects the fluid supply for vehicle 10 in the event of a brake in the fluid connection between the towing and towed units of vehicle 10. Trailer control valve 62 allows the vehicle operator to control wheel brakes on any towed units independent of the wheel brakes 22 on the towing unit of vehicle 10 by allowing delivery of fluid directly from reservoir 38 to tractor protection valve 60 for delivery to the wheel brakes in any towed units. Dash control valve 62 allows the vehicle operator to implement several functions including releasing parking brakes in wheel brakes 22 on vehicle 10 by supplying fluid pressure to oppose spring forces in the actuators for wheel brakes 22. Modulators 64, 66, 68, 70, 72 are provided to implement an anti-lock braking function. During normal braking, modulators 64, 66, 68, 70, 72 allow fluid pressure to pass from relay valves 52, 54 to the actuators of wheel brakes 22 without interference. During a loss of traction, however, signals from controller 36 cause modulators 64, 66, 68, 70, 72 to modulate the fluid pressure to prevent lockup of the wheels.

Figure 2:
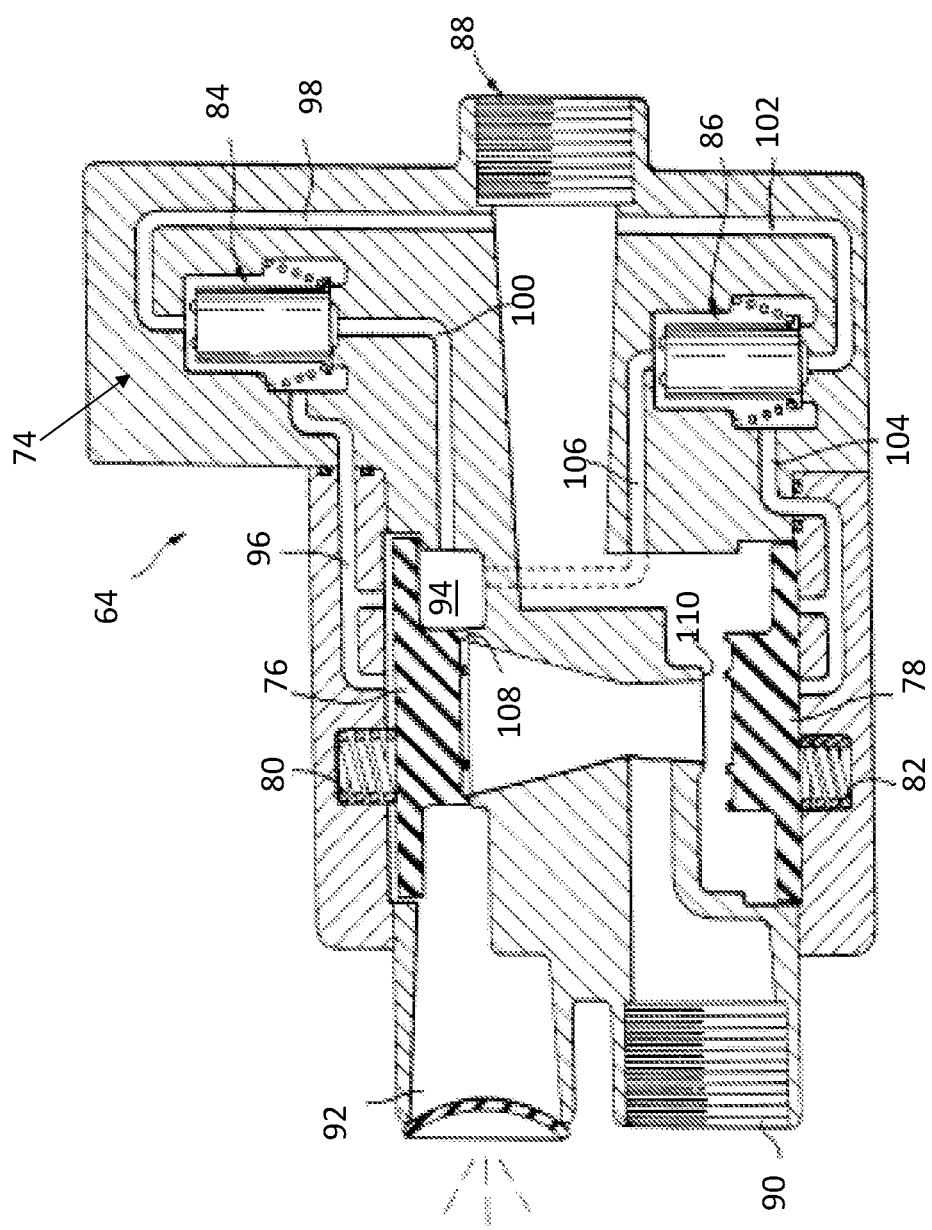
FIG. 2 is a cross-section of a modulator of the braking system of FIG. 1.

Referring now to FIG. 2, a conventional structure for modulator 64 is illustrated. It should be understood that modulators 66, 68, 70, 72 may have a similar construction. Modulator 64 includes a housing 74, an exhaust diaphragm 76, a holding diaphragm 78, springs 80, 82, an exhaust solenoid 84 and a holding solenoid 86.

Housing 74 is provided to position and orient the other components of modulator 64 and defines a plurality of fluid chambers and passages through which fluid may be routed through housing 74. Housing 74 defines an inlet or supply port 88 for delivery of fluid from a fluid source such as reservoir 38, an outlet or delivery port 90 in fluid communication with an actuator for wheel brake 22 and an exhaust port 92 in fluid communication with ambient atmosphere. Housing 74 further defines various fluid chambers including exhaust cavity 94 and fluid passages including fluid passages 96, 98, 100, 102, 104, 106.

Exhaust diaphragm 76 controls fluid communication between delivery port 90 and exhaust port 92. Exhaust diaphragm 76 is normally closed as shown in FIG. 2, being urged into sealing engagement with a valve seat 108 by spring 80 and by fluid pressure against the control surface of exhaust diaphragm 76 received through fluid passage 96.

Holding diaphragm 78 controls fluid communication between supply port 88 and delivery port 90. Holding diaphragm 78 is normally open as shown in FIG. 2, being urged away from sealing engagement with a valve seat 110 by fluid pressure at supply port 88 and/or delivery port 90.

Exhaust solenoid 84 controls the position of exhaust diaphragm 76. In the absence of current, exhaust solenoid 84 allows fluid communication between passage 98 extending from supply port 88 and fluid passage 96 and closes fluid passage 100 to exhaust chamber 94. When current is provided to exhaust solenoid 84 and exhaust solenoid 84 is energized, exhaust solenoid 84 allows fluid communication between passages 98, 100 and closes passage 96 whereupon the higher pressure at delivery port 90 forces exhaust diaphragm off of seat 108 to permit venting of the fluid pressure at delivery port 90 through exhaust port 92.

Holding solenoid 86 controls the position of holding diaphragm 78. In the absence of current, holding solenoid 86 closes fluid passage 102 and allows communication between fluid passage 104 which is in the fluid communication with the control surface of holding diaphragm 78 and fluid passage 106 which is in fluid communication with exhaust port 92 through exhaust chamber 84 thereby venting passage 104. When current is provided to holding solenoid 86 and holding solenoid 86 is energized, holding solenoid 86 closes fluid passage 106 and allows communication between fluid passage 102 which is in fluid communication with supply port 88 and fluid passage 104 thereby providing fluid to the control surface of holding diaphragm 78 which, together with the force of spring 82, urges holding diaphragm 78 into sealing engagement with valve seat 110 to prevent fluid communication between supply port 88 and delivery port 90. During normal operation, holding solenoid 86 is typically actuated whenever controller 36 determines, responsive to signals from wheel speed sensors 28, that a wheel is about to lock up to thereby maintain the pressure level in the actuator for wheel brake 22 (exhaust solenoid 84 may also be actuated to decrease the pressure in the actuator). Holding solenoid 86 is also typically actuated whenever exhaust solenoid 84 is actuated to prevent fluid pressure at supply port 74 from exhausting to atmosphere through exhaust port 92.

Referring again to FIG. 1, sensors 26, 28, 30, 32, 34 are provided to identify various conditions associated with vehicle 10 and the surrounding environment including conditions that may impact the operation of braking system 20. Sensor 26 may comprise an engine or transmission speed sensor and generate a signal indicative of the speed of vehicle 10. Sensor 28 may comprise a wheel speed sensor and also generate a signal indicative of the speed of vehicle 10. A wheel speed sensor 28 may be disposed proximate each wheel of vehicle 10. Sensor 30 may comprise a pressure sensor that generates a signal indicative of the fluid pressure at various locations within fluid circuit 24. Although only one pressure sensor 30 is illustrated in FIG. 1, it should be understood that pressure sensors 30 may be located throughout fluid circuit 24. Sensor 32 may comprise a steer angle sensor that generates a signal indicative of a steering angle imparted by a vehicle operator to a steering wheel in vehicle 10. Sensor 34 may comprise a yaw rate sensor that generates a signal indicative of the angular velocity of vehicle 10 about its vertical (yaw) axis. Sensors 26, 28, 30, 32, 34 may communicate with controller 36 in a variety of ways including over dedicated wires or other conductors or over a conventional vehicle communications bus implementing a communications network such as a controller area network (CAN) or local interconnect network (LIN) or over a vehicle power line through power line communication (PLC) in accordance with various industry standard protocols including by not limited to SAE J1939, SAEJ1922, and SAE J2497 or a proprietary protocol.

Figure 4:
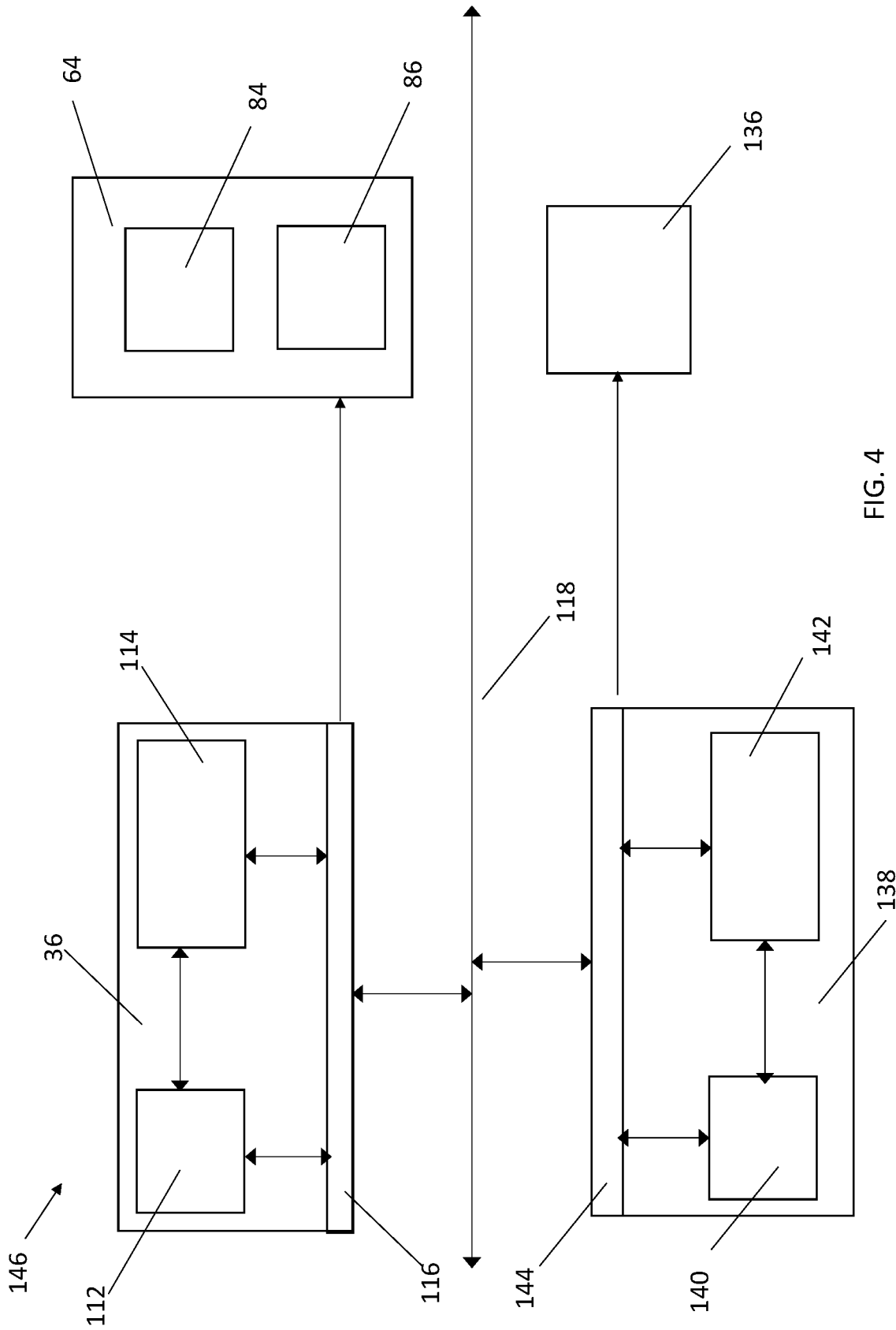
FIG. 4 is a diagrammatic view of one embodiment of a system for testing the braking system of FIG. 1 and the steering system of FIG. 2 in accordance with the teachings set forth herein.

Brake controller 36 controls the operation of electropneumatic modules such as relay valves 52, 54 and modulators 64, 66, 68, 70, 72 in order to control the fluid pressure delivered to wheel brakes 32 and, therefore, the braking force applied to the wheels. Controller 36 may comprise a programmable microprocessor or microcontroller or may comprise an application specific integrated circuit (ASIC). Referring to FIG. 4, brake controller 36 may include a memory 112 and a central processing unit (CPU) 114. Brake controller 36 may also include an input/output (I/O) interface 116 including a plurality of input/output pins or terminals through which controller 36 may receive a plurality of input signals and transmit a plurality of output signals. The input and output signals may be transmitted and received over dedicated wires or other conductors or over a conventional vehicle communications bus 118 as described hereinabove. The input signals may include signals received from various sensors including one or more of sensors 26, 28, 30, 32, 34 and signals received from operator interfaces and other vehicle control systems. In accordance with one aspect of the teachings disclosed herein, the input signals may also include signals from a controller for a steering system for vehicle 10 described in greater detail hereinbelow. The output signals may include signals used to control relay valves 52, 54 and modulators 64, 66, 68, 70, 72 and, in particular, the solenoids in relay valves and modulators 64, 66, 68, 70, 72 such as exhaust solenoid 84 and holding solenoid 86 of each modulator 64, 66, 68, 70, 72.

Figure 3:
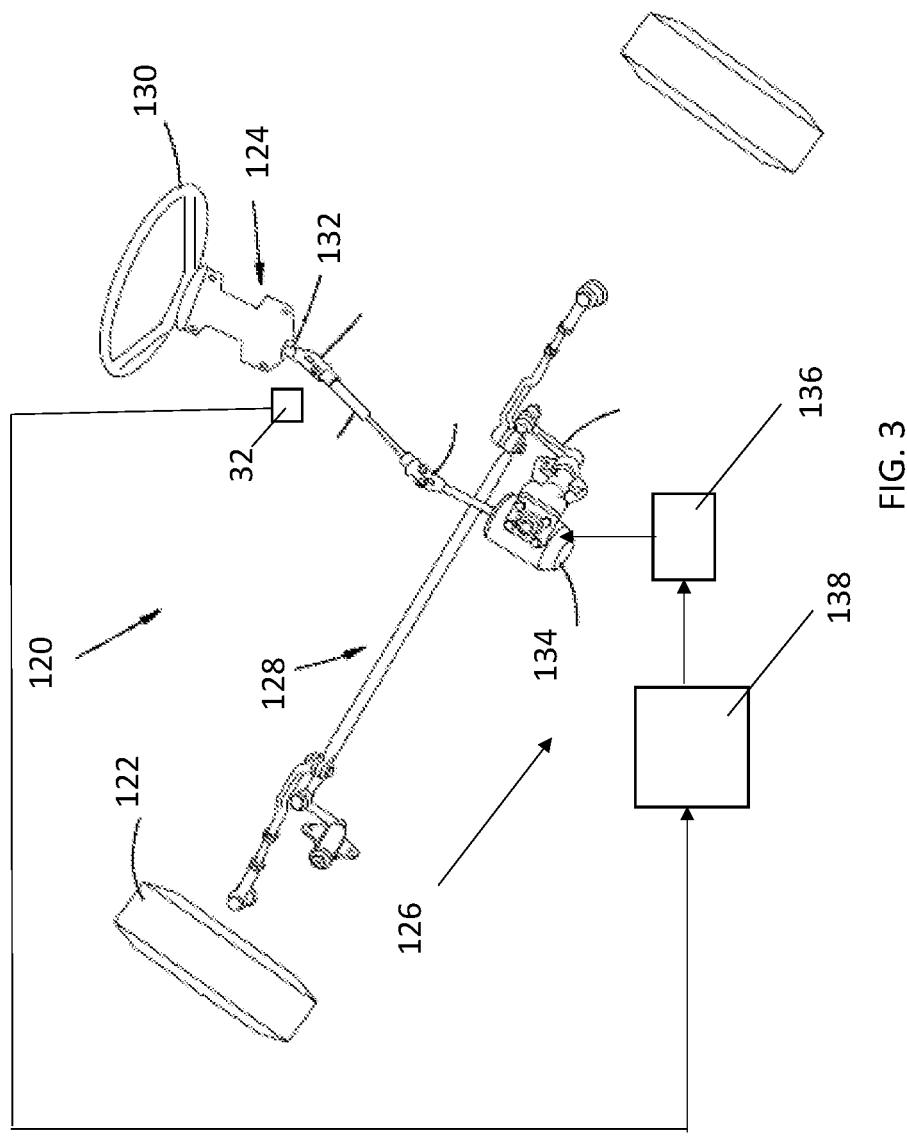
FIG. 3 is a diagrammatic view of a steering system for a vehicle.

Referring to FIG. 3, vehicle 10 further includes a steering system 120. System 120 provides a means for the operator of vehicle 10 to input steering forces to vehicle 10 to turn one or more steerable wheels 122 (e.g., those on steer axle 14) on vehicle 10. System 120 may include a steering column 124, a power steering system 126, and a steering linkage 128.

Steering column 124 provides a means for the operator to input steering forces and to transfer those forces to steerable wheels 122 on vehicle 10. Column 124 may include a steering wheel 130 that is rotated by the vehicle operator and that is coupled to, and configured to rotate, a steering shaft 132 that is ultimately coupled to, and provides an input to, the power steering system 126.

Power steering system 126 transfers and augments forces input by the vehicle operator through steering column 124 to steering linkage 128 in order to turn the wheels 122. In certain embodiments, system 126 may also assist the vehicle operator in maintaining the position of vehicle 10 relative to a lane of travel in response to signals generated by a lane keep assist system on vehicle 10. In accordance with one aspect of the systems and methods disclosed herein, system 126 may further be used in testing steering system 120 by causing predefined rotational movements of steering wheel 130 upon activation of the vehicle 10 that provide visual and/or haptic feedback to the operator of vehicle 10 regarding the operation of steering system 120. System 126 includes a steering gear 134, a steering actuator 136 and a steering controller 138.

Steering gear 134 transfers forces input by the vehicle operator through steering column 124 to steering linkage 128 in order to turn the wheels 122. Steering gear 134 may comprise rack and pinion gears or a recirculating ball gear.

Steering actuator 136 generates a force to cause movement of steering gear 134 responsive to control signals from controller 138. This force may be added to the forces input through steering column 124 to assist in steering (i.e., a torque overlay). Alternatively, this force may be generated independent of forces input through steering column for lane keep assist functionality and for testing steering system 120 as referenced above. Steering actuator 136 may comprise an electromagnetic actuator in which an energized conductor (which may be paired with a permanent magnet) creates an electromagnetic circuit with rotational components of the steering gear 134 to cause rotation of those components.

Steering controller 138 is provided to control steering actuator 136. During normal operation of vehicle 10, steering controller 138 receives input signals from steer angle and torque sensors on the steering column 124, such as steer angle sensor 32, indicative of inputs from the vehicle operator and generates output signals to control steering actuator 136 to assist movement of steering gear 134. Steering controller 138 may also generate output signals to control steering actuator 136 independent of movement of the steering column 124 by the vehicle operator. For example, steering controller 138 may generate and transmit output signals to steering actuator 136 responsive to signals from various sensors (e.g., cameras) or a separate lane keep assistance controller indicating that vehicle 10 is unintentionally drifting out of the lane of travel. In accordance with the systems and methods disclosed herein, steering controller 138 may also generate and transmit output signals to steering actuator 136 to cause movement of steering gear 134 and, as a result, steering column 124, to test the operation of steering system 120 and provide visual and/or haptic feedback to the vehicle operator regarding the operation of steering system 120. Steering controller 138 may comprise a programmable microprocessor or microcontroller or may comprise an application specific integrated circuit (ASIC). Referring to FIG. 4, steering controller 138 may include a memory 140 and a central processing unit (CPU) 142. Steering controller 138 may also include an input/output (I/O) interface 144 including a plurality of input/output pins or terminals through which steering controller 138 may receive a plurality of input signals and transmit a plurality of output signals. The input and output signals may be transmitted and received over dedicated wires or other conductors or over a conventional vehicle communications bus 118 as described hereinabove. The input signals may include signals received from various sensors including the steer angle and torque sensors referenced above and signals from sensor or systems indicating unintentional departure from a lane of travel. In accordance with one aspect of the teachings disclosed herein, the input signals may also include signals from brake controller 36 for braking system 20. The output signals may include signals used to control steering actuator 136 and, therefore, movement of steering gear 134.

Referring again to FIG. 3, steering linkage 128 translates movement of steering gear 134 into corresponding movement of wheels 122. Linkage 128 includes a combination of rods and levers that are moved laterally by steering gear 134 to turn wheels 122. Linkage 128 may, for example include steering knuckles, tie rods, links, an idler arm and a Pittman arm that is driven by steering gear 134

Referring again to FIG. 4, one embodiment of a system 146 for testing braking system 20 and steering system 120 of vehicle is illustrated. System 146 combines elements of braking system 20 including electropneumatic modules such as relay valves 52, 54 and/or modulators 64, 66, 68, 70 and brake controller 36 and elements of steering system 120 including steering actuator 136 and steering controller 138. In accordance with one aspect of the systems and methods disclosed herein, system 146 synchronizes testing of braking system 20 and steering system 120 to enable the tests to be performed at least partially simultaneously while doing so in manner that makes it easier for an operator of vehicle 10 or other observes to observe the outputs of each test. In the illustrated embodiment, controllers 36, 138 communicated with each another to synchronize generation of control signals to electropneumatic modules such as relay valves 52, 54 and/or modulators 64, 66, 68, 70 and steering actuator 136. It should be understood, however, other embodiments may combine the relevant functionality of controllers 36 and 138 into a single controller that synchronizes the timing of control signals to electropneumatic modules such as relay valves 52, 54 and/or modulators 64, 66, 68, 70 and steering actuator 136 based on the internal programming of the controller and without the exchange of signals between controllers 36 and 138 in system 146.

Figure 5A:
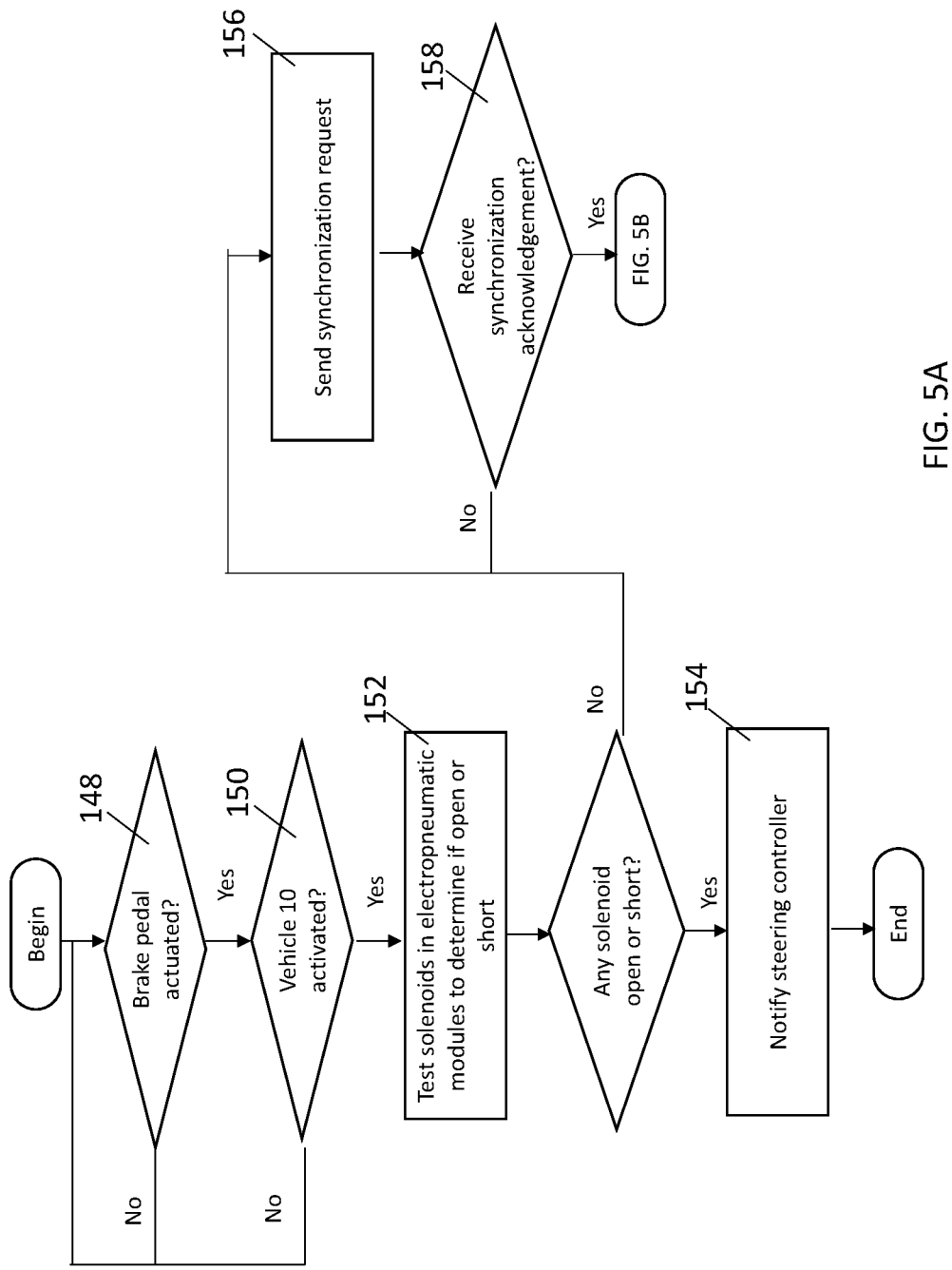
FIGS. 5A-B are flow chart diagrams illustrating several steps in one embodiment of a method for testing the braking system of FIG. 1 and steering system of FIG. 2 in accordance with the teachings set forth herein.
Figure 5B:
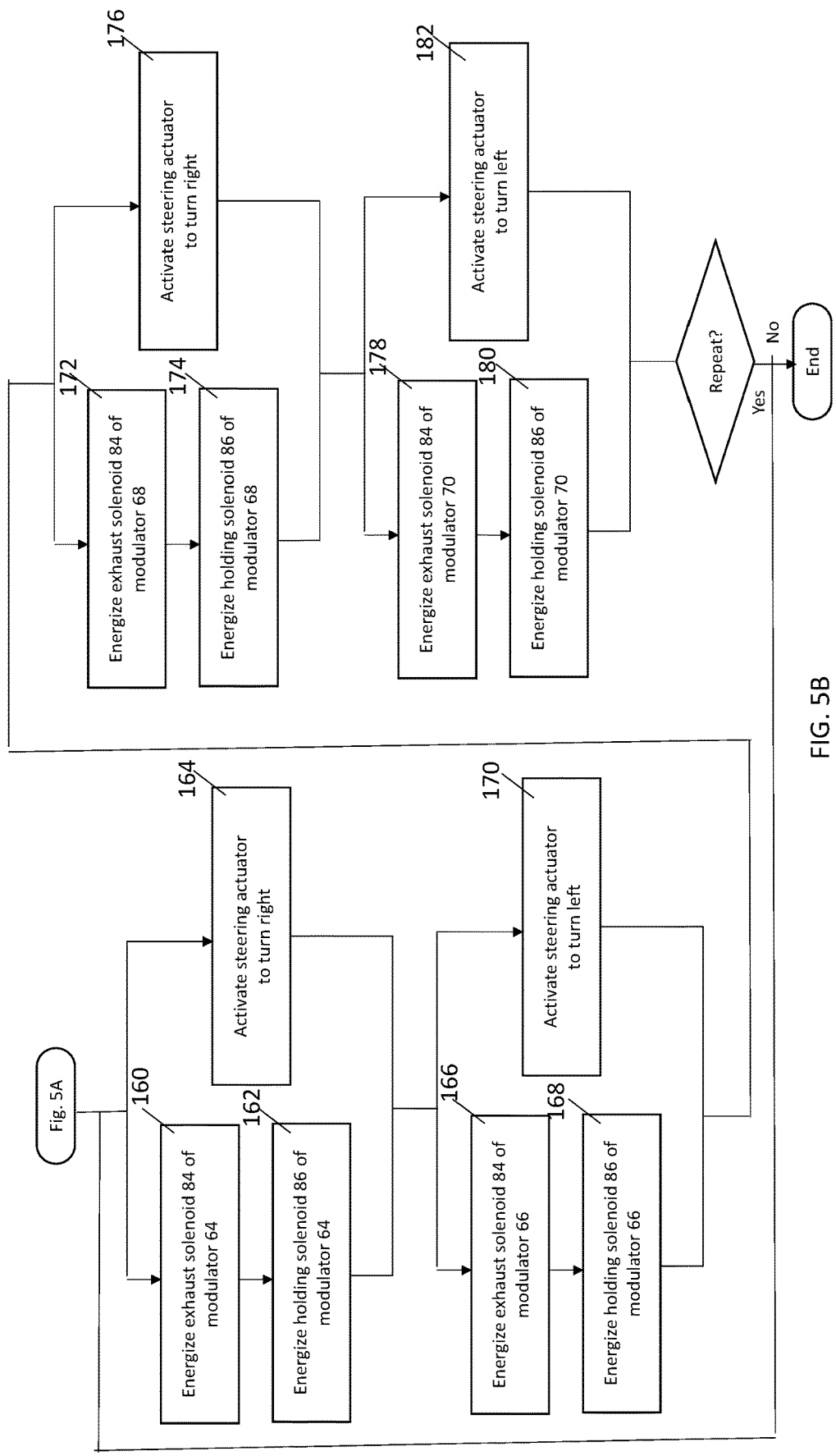

Referring now to FIGS. 5A-B, in accordance with the present teachings controllers 36 and 138 may be configured with appropriate programming instructions (i.e., software or a computer program) to implement several steps in a method for testing braking system 20 and steering system 120 of vehicle 10. The instructions or computer program may be encoded on one or more non-transitory computer storage mediums such as memories 122, 140 or another memory accessible by controllers 36, 138. The program and method are intended to implement testing of the braking system 20 and steering system 122 in a synchronized manner that enables the tests to be performed at least partially simultaneously while doing so in manner that makes it easier for an operator of vehicle 10 or other observers to observe the outputs of each test. In this manner, the system and method enable the tests to be performed in an efficient manner that prevents operating delays for vehicle 10 while ensuring that the results of the tests can be adequately monitored and observed by the vehicle operator or other observers.

The method may begin with the steps 148, 150 of determining whether the brake pedal has been actuated and whether vehicle 10 has been started or activated. Controllers 36, 138 may use actuation of the brake pedal while activating vehicle 10 as a trigger to initiate subsequent testing of the braking system 20 and steering system 120 by controllers 36, 138. The operator of vehicle 10 may actuate the brake pedal by depressing the brake pedal associated with foot pedal valve 50. The operator of vehicle 10 may activate vehicle 10 by, for example turning a key or pushing a button. Controllers 36 and/or 138 may detect actuation of the brake pedal by the vehicle operator and activation of vehicle 10 by the vehicle operator based on signals from various sensors and systems on vehicle 10. For example, as to actuation of the foot pedal, a position sensor may generate a signal indicative of the change in position of the foot pedal or a pressure sensor may generate a signal indicative of a change in pressure in fluid circuit 24. As to activation of vehicle 10, position sensors indicative of the position or state of a start or ignition switch, voltage or current sensors indicative of the delivery of voltage or current from the vehicle battery, sensors indicative of the activation of various systems on vehicle 10 (e.g., power transmission systems or exhaust systems in vehicles where vehicle 10 includes an internal combustion engine or motors used to drive the vehicle wheels where vehicle 10 comprises an electric or hybrid vehicle) may provide an indication that vehicle 10 has moved from an inactive state to an active state.

If brake controller 36 determines that the brake pedal has been actuated and that vehicle 10 has been activated, the method may continue with the step 152 of testing the solenoids in electropneumatic modules such as relay valves 52, 54 and modulators 64, 66, 68, 70 to determine whether any of the solenoids are electrically open or shorted. If any of the solenoids are electrically open or shorted, the method may conclude with the step 154 of generating one or more warnings to the operator of vehicle 10 or to other individuals or vehicle systems and terminating the method. Brake controller 36 may, for example, generate and transmit a signal to an operator interface to cause the interface to provide a visual, audio and/or haptic warning to the operator of vehicle 10. Brake controller 36 may also generate and transmit a signal to a remote system (e.g., fleet management) through a telematics unit on vehicle 10. Brake controller 36 may further record information regarding the electrically open or short solenoid(s) in memory 112 or another memory for later retrieval by conventional diagnostic tools. Finally, brake controller 36 may generate and transmit a signal to steering controller 138 indicating that further testing of steering system 120 should be terminated.

If none of the solenoids in electropneumatic modules such as relay valves 52, 54 and modulators 64, 66, 68, 70 are electrically open or shorted, the method may continue with steps 156, 158 to synchronize further testing of braking system 20 and steering system 120. The testing of braking system 20 and steering system 120 may be synchronized in several ways. In one embodiment, testing is synchronized through an initial exchange of synchronization request and acknowledgment signals and establishment of times in each of controllers 36, 138 for subsequent steps based on those signals. In step 156 one of brake controller 36 or steering controller 138 may establish a time for transmission of a corresponding control signal to a solenoid of an electropneumatic module in braking system 20 or the steering actuator 136 of steering system 120 and transmit a synchronization request signal to the other of controllers 36, 138 establishing proposed timing for further steps in the testing of braking system 20 and steering system 120. In step 158, the controller 36 or 138 receiving the synchronization request signal may establish a time for transmission of the other of the corresponding control signal to a solenoid of an electropneumatic module in braking system 20 or the steering actuator 136 of steering system 120 and transmit a synchronization acknowledgement signal to the controller 36 or 138 transmitting the synchronization request signal acknowledging and approving the proposed timing for further steps in the testing of braking system 20 and steering system 122. Steps 156, 158 may be repeated until controllers 36, 138 agree on the timing of further steps in the testing of braking system 20 and steering system 120 and an appropriate synchronization acknowledgement signal is generated. In another embodiment, testing is synchronized through an initial exchange of synchronization request and acknowledgment signals and continuous exchange of synchronization state signals indicative of the state of each of braking system 20 and steering system 120. Once a synchronization request issued by one of controllers 36, 138 has been acknowledged, the requesting controller 36, 138 may transmit a corresponding control signal and, substantially contemporaneously, a synchronization state signal to the other controller 36, 138 indicating generation and transmission of the control signal and, therefore, actuation of a solenoid in an electropneumatic module or steering actuator 136. In this case, substantially contemporaneously means at the same time that the control signal is generated and transmitted or within a period of time after generation and transmission of the control signal sufficient to permit simultaneous actuation of the solenoid and steering actuator 136 as discussed below. Receipt of the synchronization state signal will cause the other, receiving controller 36, 138 to generate a corresponding control signal to cause actuation of a solenoid in an electropneumatic module or steering actuator 136. Controllers 36, 138 may continue to generate and exchange synchronization state signals substantially contemporaneously with generation of each control signal to trigger a sequence of actions by each controller 36, 13 as discussed below. It should be understood that either controller 36, 138 may initiate the synchronization process. It should further be understood that, in embodiments with a single controller for braking system 20 and steering system 120, steps 156, 158 may be omitted and the timing of subsequent testing steps managed by the single controller.

Referring now to FIG. 5B, once the synchronization acknowledgement signal is received, the method may continue with additional testing of braking system 20 and steering system 120 synchronized in any of several ways as discussed above. For example, the initial steps may be performed after a predetermined time delay that is either preset in controllers 36, 138 and triggered by transmission (for controller 138) and receipt (for controller 36) of the synchronization acknowledgement signal or established by, and agreed to by, controllers 36, 138 during the synchronization steps 156, 158 discussed above. Alternatively, controllers 36, 138 may continuously exchange synchronization state signals as each controller generates corresponding control signals.

Subsequent steps in the testing of braking system 20 are intended to determine whether any of the solenoids in an electropneumatic module are mis-wired. For example, each modulator 64, 66, 68, 70 typically has three wires-a first wire through which current is provided to both exhaust solenoid 84 and holding solenoid 86, a second wire acting as a ground for exhaust solenoid 84 and a third wire acting as a ground for holding solenoid 86. Subsequent steps in the method may identify situations in which the ground wires for exhaust solenoid 84 and holding solenoid 86 in any of modulators 64, 66, 68, 70 have been reversed. In addition, or alternatively, subsequent steps in the method may identify situations in which a wire to one electropneumatic module has been incorrectly routed from the intended electropneumatic module to a different electropneumatic module. The method identifies situations in which the ground wires for exhaust solenoid 84 and holding solenoid 86 in modulators 64, 66, 68, 70 are reversed by actuating each of exhaust solenoid 84 and holding solenoid 86 of a given modulator 64, 66, 68, 70 in a different manner. Actuation of exhaust solenoid 84 creates an audible "popping" noise (commonly referred to as a "chuff") as fluid is exhausted to atmosphere. Actuation of holding solenoid 86 does not result in a similar noise because holding solenoid 86 controls the flow of fluid to the actuator for a wheel brake 22 such that the vehicle operator or another observer will only hear a brief clicking sound.

Therefore, for example, in one embodiment exhaust solenoid 84 is actuated for a first period of time (e.g., 10 ms) and holding solenoid 86 is actuated for a second period of time (e.g., 30 ms) different than the first period of time. In situations where the wires to the exhaust solenoid 84 and holding solenoid 86 have been reversed, exhaust solenoid 84 will be actuated for a longer period of time (e.g., 30 ms) leading to a distinctly different (louder) sound. It should be understood that particular periods of time over which solenoids 84, 86 are actuated may be varied from the example and that the manner in which solenoids 84, 86 are actuated may also be varied in other ways so long as solenoids 84, 86 are actuated in different manners to allow for an identifiable audible sound from actuation of exhaust solenoid 84. For example, in another embodiment, exhaust solenoid 84 may be actuated a first predetermined number of times while holding solenoid 86 is actuated a second predetermined number of times different than the first number of predetermined times. The method identifies situations in which any of the wires have been incorrectly routed from the intended electropneumatic module to a different electropneumatic module by actuating the solenoids of the electropneumatic module in a predetermined pattern. In the illustrated embodiment, the method actuates the solenoids 84, 86 of modulator 64 (the right front modulator), followed (as described below) by the solenoids 84, 86 of modulator 66 (the left front modulator), modulator 68 (the right rear modulator), and modulator 70 (the left rear modulator). Because the sounds generated by actuation of solenoid 84 in each modulator 64, 68, 70, 72 will come from a different location relative to the vehicle operator or another observer, the operator or observer will be able to identify which modulator 64, 68, 70, 72 is being actuated at any given time. If the modulators 64, 68, 70, 72 are not activated in the predetermined pattern, (e.g., right front, left front, right rear, left rear), the operator will be able to identify that one or more wires has been misrouted.

Subsequent steps in the testing of steering system 120 are intended to determine whether there is damage to one or more components of steering system 120 by controlling steering actuator 136 to cause movement of the steering column 124, steering gear 134, steering linkage 128 and wheels 22. The movement of steering wheel 130 on steering column 124 may be visually and/or haptically observed by the operator of vehicle 10 with the absence of movement or excess vibration or "wiggle" of steering wheel 130 indicating potential damage to one or more components of steering system 120.

The above-described testing of braking system 20 and steering system 120 are known in the art and additional description of the testing of the braking system 20 may be found in U.S. U.S. Pat. Nos. 5,327,781 A and 6,237,401 B1, the entire disclosures of which are incorporated herein by reference. Because the vehicle operator or other observers must account for visual, audio, or haptic outputs resulting from the testing of each system 20, 120, it can be difficult for the operator or observer to monitor the testing and to understand and record the results of each test if the tests are performed contemporaneously. This issue can be addressed by arranging for the testing of systems 20, 120 to occur sequentially, but doing so may create undesirable delays in operating vehicle 10. The systems and methods disclosed herein address these competing demands by synchronizing the testing of systems 20, 120 in a logical manner to allow the testing of systems 20, 120 to be performed simultaneously or to overlap while still enabling the vehicle operator or another observer to monitor and understand the results of the testing of both systems 20, 120.

Referring again to FIG. 5B, the method may continue with the steps 160, 162, 164 in which brake controller 36 generates and transmits one control signal to modulator 64 configured to actuate exhaust solenoid 84 of modulator 64 and another control signal to modulator 64 configured to actuate holding solenoid 86 of modulator 64 and steering controller 138 generates and transmits a control signal to steering actuator 136 configured to cause rotation of steering wheel 130. As discussed above, the control signals transmitted to exhaust solenoid 84 and holding solenoid 86 are configured to actuate exhaust solenoid 84 and holding solenoid 86 in different manners (e.g., for different periods of time) to allow the vehicle operator or another observer to determine if wiring to solenoids 84, 86 has been reversed. If modulator 64 is wired properly, the control signals to modulator 64 should result in a distinctive sound from the area of modulator 64 observable by the vehicle operator or others as described above. If modulator 64 is not wired properly, a different sound will be produced or the sound will come from a different modulator/location. If steering system 120 is functioning properly, the vehicle operator will observe (visually or haptically), movement of steering wheel 130 without substantial vibration of steering wheel 130. If steering system 120 is not functioning properly, the vehicle operator may observe the absence of movement of steering wheel 130 or substantial vibration during movement of steering wheel 130. As illustrated in FIG. 5B, step 164 occurs simultaneously with one or both of steps 160, 162 such that the performance of step 164 at least partially overlaps with the performance of one or both of steps 160, 162 and rotation of the steering wheel 130 occurs during actuation of one or both of exhaust solenoid 84 and holding solenoid 84 of modulator 64. In this manner, testing of braking system 20 and steering system 120 may be performed more efficiently than if the testing of systems 20, 120 was performed sequentially thereby avoiding undesirable delays in operating vehicle 10. It should be understood that the overlap between steps 160, 162 and step 164 may vary such that the performance of step 164 at least partially overlaps with the performance of one of steps 160, 162 or both of steps 160, 162. Where steps 160, 162 cause solenoids 84, 86 to be actuated during a first period of time and a second period of time, respectively, the performance of step 164 may occur during a portion of at least one of the first period of time and second period of time. As illustrated in FIG. 5B, the control signal for steering actuator 136 will also cause steering wheel 130 to rotate in the direction of modulator 64 (to the right in the illustrated embodiment). As a result, the operator is able to more easily monitor and process the results of the simultaneous testing of braking system 20 and steering system 120.

Following the completion of steps 160, 162, 164 and either a predetermined time delay determined by, and agreed to by, controllers 36, 138 during the synchronization steps 154, 156 discussed above or the exchange of one or more synchronization state signals, the method may continue with the steps 166, 168, 170 in which brake controller 36 generates and transmits one control signal to modulator 66 configured to actuate exhaust solenoid 84 of modulator 66 and another control signal to modulator 66 configured to actuate holding solenoid 86 of modulator 66 and steering controller 138 generates and transmits a control signal to steering actuator 136 configured to cause rotation of steering wheel 130. Referring to FIG. 1, in the illustrated embodiment, modulator 66 is disposed on the same axle 12 as modulator 64, but on the opposite side of vehicle 10. As illustrated in FIG. 5B, step 170 again occurs simultaneously with one or both of steps 166, 168 such that the performance of step 170 at least partially overlaps with the performance of one or both of steps 166, 168 and rotation of the steering wheel 130 occurs during actuation of one or both of exhaust solenoid 84 and holding solenoid 84 of modulator 66. The control signal for steering actuator 136 will cause steering wheel 130 to rotate in the direction of modulator 66 (to the left in the illustrated embodiment) again enabling the operator to more easily monitor and understand the results of the simultaneous testing of braking system 20 and steering system 120.

Following the completion of steps 166, 168, 170 and another predetermined time delay determined by, and agreed to by, controllers 36, 138 during the synchronization steps 154, 156 discussed above or the exchange of one or more synchronization state signals, the method may continue with the steps 172, 174, 176 in which brake controller 36 generates and transmits one control signal to modulator 68 configured to actuate exhaust solenoid 84 of modulator 68 and another control signal to modulator 68 configured to actuate holding solenoid 86 of modulator 68 and steering controller 138 generates and transmits a control signal to steering actuator 136 configured to cause rotation of steering wheel 130. Referring again to FIG. 1, in the illustrated embodiment modulator 68 is disposed on a different axle 14 relative to modulators 64, 66 and on the same side of the vehicle as modulator 64. As illustrated in FIG. 5B, step 176 again occurs simultaneously with one or both of steps 172, 174 such that the performance of step 176 at least partially overlaps with the performance of one or both of steps 172, 174 and rotation of the steering wheel 130 occurs during actuation of one or both of exhaust solenoid 84 and holding solenoid 84 of modulator 68. The control signal for steering actuator 136 will again cause steering wheel 130 to rotate in the direction of modulator 68 (to the right in the illustrated embodiment) enabling the operator to more easily monitor and understand the results of the simultaneous testing of braking system 20 and steering system 120.

Following the completion of steps 172, 174, 176 and another predetermined time delay determined by, and agreed to by, controllers 36, 138 during the synchronization steps 154, 156 discussed above or the exchange of one or more synchronization state signals, the method may continue with the steps 178, 180, 182 in which brake controller 36 generates and transmits one control signal to modulator 70 configured to actuate exhaust solenoid 84 of modulator 70 and another control signal to modulator 70 configured to actuate holding solenoid 86 of modulator 70 and steering controller 138 generates and transmits a control signal to steering actuator 136 configured to cause rotation of steering wheel 130. Referring again to FIG. 1, in the illustrated embodiment modulator 70 is disposed on same axle 14 as modulator 68, but on a different side of vehicle 10 relative to modulator 68. As illustrated in FIG. 5B, step 182 again occurs simultaneously with one or both of steps 178, 180 such that the performance of step 182 at least partially overlaps with the performance of one or both of steps 178, 180 and rotation of the steering wheel 130 occurs during actuation of one or both of exhaust solenoid 84 and holding solenoid 84 of modulator 70. The control signal for steering actuator 136 will again cause steering wheel 130 to rotate in the direction of modulator 70 (to the left in the illustrated embodiment of FIG. 1) enabling the operator to more easily monitor and understand the results of the simultaneous testing of braking system 20 and steering system 120.

In the illustrated embodiment, modulators 64, 66, 80, 70 on two axles 14, 16 are tested. It should be understood, however, that the same tests may be performed on additional axles on vehicle 10 where additional modulators are present. As indicated in FIG. 5B, steps 160 through 182 may be repeated one or more times depending on the embodiment.

Although particular embodiments of systems and methods for testing braking system 20 and steering system 120 have been described and illustrated herein, it should be appreciated that a number of variations are possible. For example, the testing of braking system 20 may include actuation of solenoids in additional or different electropneumatic modules such as modulator 72 and/or relay valves 52, 54. The systems and methods disclosed herein could also be extended to synchronize the testing of other vehicle systems such as power transmissions systems, operator interfaces, access (door and window) control systems, lighting systems and audio systems.

A system 146 and method for testing a braking system 20 and a steering system 120 of a vehicle 10 in accordance with the teachings disclosed herein is advantageous relative to conventional systems and methods. In particular, the system 146 and method disclosed herein synchronize testing of the braking system 20 and steering system 120 in manner that enables the tests to be performed at least partially simultaneously while doing so in manner that makes it easier for an operator of the vehicle 10 to observe the outputs of each test. In this manner, the system 146 and method enable the tests to be performed in an efficient manner that prevents operating delays for the vehicle 10 while ensuring that the results of the tests can be adequately monitored and observed by the vehicle operator or other observers.

While the invention has been shown and described with reference to one or more particular embodiments thereof, it will be understood by those of skill in the art that various changes and modifications can be made without departing from the spirit and scope of the invention.

What is claimed is:

1. A system for testing a braking system and a steering system of a vehicle, comprising:
a plurality of electropneumatic modules, each electropneumatic module associated with a corresponding brake for a corresponding wheel of the vehicle and including a first solenoid configured to control fluid communication between a brake actuator for the corresponding brake and one of a fluid source and atmosphere;
a steering actuator configured to cause rotation of a steering wheel of the vehicle; and,
a controller configured to
transmit a first control signal to a first electropneumatic module of the plurality of electropneumatic modules, the first electropneumatic module associated with a first brake for a first wheel on a first side of the vehicle, the first control signal configured to actuate the first solenoid of the first electropneumatic module; and,
transmit a second control signal to the steering actuator wherein the second control signal is configured to cause rotation of the steering wheel during actuation of the first solenoid of the first electropneumatic module in a first rotational direction towards the first side of the vehicle.

2. The system of claim 1 wherein the controller is further configured to:
transmit a third control signal to a second electropneumatic module of the plurality of electropneumatic modules, the second electropneumatic module associated with a second brake for a second wheel on a second side of the vehicle opposite the first side of the vehicle, the third control signal configured to actuate the first solenoid of the second electropneumatic module; and, transmit a fourth control signal to the steering actuator, wherein the fourth control signal is configured to cause rotation of the steering wheel during actuation of the first solenoid of the second electropneumatic module in a second rotational direction opposite the first rotational direction and towards the second side of the vehicle.

3. The system of claim 2 wherein the first wheel and second wheel are supported on the same axle of the vehicle.

4. The system of claim 1 wherein the controller is further configured to:

transmit a third control signal to a second electropneumatic module of the plurality of electropneumatic modules, the second electropneumatic module associated with a second brake for a second wheel on the first side of the vehicle, the third control signal configured to actuate the first solenoid of the second electropneumatic module; and, transmit a fourth control signal to the steering actuator wherein the fourth control signal is configured to cause rotation of the steering wheel during actuation of the first solenoid of the second electropneumatic module in the first rotational direction.

5. The system of claim 1 wherein each electropneumatic module of the plurality of electropneumatic modules further includes a second solenoid configured to control fluid communication between the brake actuator for the corresponding brake and the other of the fluid source and atmosphere, the controller is further configured to transmit a third control signal to the first electropneumatic module, the third control signal configured to actuate the second solenoid of the first electropneumatic module, and the first control signal is configured to actuate the first solenoid of the first electropneumatic module in a first manner and the third control signal is configured to actuate the second solenoid of the first electropneumatic module in a second manner different than the first manner.

6. The system of claim 1 wherein each electropneumatic module of the plurality of electropneumatic modules further includes a second solenoid configured to control fluid communication between the brake actuator for the corresponding brake and the other of the fluid source and atmosphere, the controller is further configured to transmit a third control signal to the first electropneumatic module, the third control signal configured to actuate the second solenoid of the first electropneumatic module, the first control signal is configured to actuate the first solenoid of the first electropneumatic module for a first period of time and the third control signal is configured to actuate the second solenoid of the first electropneumatic module for a second period of time different than the first period of time and the second control signal is configured to actuate the steering actuator during a portion of at least one of the first period of time and the second period of time.

7. The system of claim 1 wherein the controller includes:

a brake controller configured to generate the first control signal; and, a steering controller configured to generate the second control signal; and wherein one of the brake controller and the steering controller is configured to establish a first time for transmission of a corresponding one of the first and second control signals and to transmit a synchronization request signal to another one of the brake controller and the steering controller and the another one of the brake controller and the steering controller is configured to receive the synchronization request signal and establish a second time for transmission of the other corresponding one of the first and second control signals, the first and second times synchronized to cause rotation of the steering wheel during actuation of the first solenoid of the first electropneumatic module.

8. The system of claim 1 wherein the controller includes:

a brake controller configured to generate the first control signal; and, a steering controller configured to generate the second control signal; and wherein one of the brake controller and the steering controller is configured to transmit a synchronization state signal to another one of the brake controller and the steering controller substantially contemporaneously with transmission of a corresponding one of the first and second control signals, the synchronization state signal causing the another one of the brake controller and the steering controller to generate the other of the corresponding one of the first and second control signals.

9. An article of manufacture, comprising:

a non-transitory computer storage medium having a computer program encoded thereon that when executed by a controller tests a braking system and a steering system of a vehicle, the computer program including code for transmitting a first control signal to a first electropneumatic module of a plurality of electropneumatic modules on the vehicle, each electropneumatic module associated with a corresponding brake for a corresponding wheel of the vehicle and including a first solenoid configured to control fluid communication between a brake actuator of the corresponding brake and one of a fluid source and atmosphere, the first electropneumatic module associated with a first brake for a first wheel on a first side of the vehicle, the first control signal configured to actuate the first solenoid of the first electropneumatic module; and, transmitting a second control signal to a steering actuator configured to cause rotation of a steering wheel of the vehicle wherein the second control signal is configured to cause rotation of the steering wheel during actuation of the first solenoid of the first electropneumatic module in a first rotational direction towards the first side of the vehicle.

10. The article of manufacture of claim 9 wherein the computer program further includes code for:

transmitting a third control signal to a second electropneumatic module of the plurality of electropneumatic module, the second electropneumatic module associated with a second brake for a second wheel on a second side of the vehicle opposite the first side of the vehicle, the third control signal configured to actuate the first solenoid of the second electropneumatic module; and, transmitting a fourth control signal to the steering actuator wherein the fourth control signal is configured to cause rotation of the steering wheel during actuation of the first solenoid of the second electropneumatic module in a second rotational direction opposite the first rotational direction and towards the second side of the vehicle.

11. The article of manufacture of claim 10 wherein the first wheel and second wheel are supported on the same axle of the vehicle.

12. The article of manufacture of claim 9 wherein the computer program further includes code for:
transmitting a third control signal to a second electropneumatic module of the plurality of electropneumatic module, the second electropneumatic module associated with a second brake for a second wheel on the first side of the vehicle, the third control signal configured to actuate the first solenoid of the second electropneumatic module; and,
transmitting a fourth control signal to the steering actuator wherein the fourth control signal is configured to cause rotation of the steering wheel during actuation of the first solenoid of the second electropneumatic module in the first rotational direction.

13. The article of manufacture of claim 9 wherein each electropneumatic module of the plurality of electropneumatic modules further includes a second solenoid configured to control fluid communication between the brake actuator for the corresponding brake and the other of the fluid source and atmosphere and the computer program further includes code for transmitting a third control signal to the first electropneumatic module, the third control signal configured to actuate the second solenoid of the first electropneumatic module, the first control signal configured to actuate the first solenoid of the first electropneumatic module in a first manner and the third control signal configured to actuate the second solenoid of the first electropneumatic module in a second manner different than the first manner.

14. The article of manufacture of claim 9 wherein each electropneumatic module of the plurality of electropneumatic modules further includes a second solenoid configured to control fluid communication between the brake actuator for the corresponding brake and the other of the fluid source and atmosphere and the computer program further includes code for transmitting a third control signal to the first electropneumatic module, the third control signal configured to actuate the second solenoid of the first electropneumatic module, the first control signal configured to actuate the first solenoid of the first electropneumatic module for a first period of time and the third control signal configured to actuate the second solenoid of the first electropneumatic module for a second period of time different than the first period of time and the second control signal configured to actuate the steering actuator during a portion of at least one of the first period of time and the second period of time.

15. A method for testing a braking system and a steering system of a vehicle, comprising:
transmitting a first control signal to a first electropneumatic module of a plurality of electropneumatic modules on the vehicle, each electropneumatic module associated with a corresponding brake for a corresponding wheel of the vehicle and including a first solenoid configured to control fluid communication between a brake actuator of the corresponding brake and one of a fluid source and atmosphere, the first electropneumatic module associated with a first brake for a first wheel on a first side of the vehicle, the first control signal configured to actuate the first solenoid of the first electropneumatic module; and,
transmitting a second control signal to a steering actuator configured to cause rotation of a steering wheel of the vehicle
wherein the second control signal is configured to cause rotation of the steering wheel during actuation of the first solenoid of the first electropneumatic module in a first rotational direction towards the first side of the vehicle.

16. The method of claim 15, further comprising:
transmitting a third control signal to a second electropneumatic module of the plurality of electropneumatic module, the second electropneumatic module associated with a second brake for a second wheel on a second side of the vehicle opposite the first side of the vehicle, the third control signal configured to actuate the first solenoid of the second electropneumatic module; and,
transmitting a fourth control signal to the steering actuator wherein the fourth control signal is configured to cause rotation of the steering wheel during actuation of the first solenoid of the second electropneumatic module in a second rotational direction opposite the first rotational direction and towards the second side of the vehicle.

17. The method of claim 16 wherein the first wheel and second wheel are supported on the same axle of the vehicle.

18. The method of claim 15, further comprising:
transmitting a third control signal to a second electropneumatic module of the plurality of electropneumatic module, the second electropneumatic module associated with a second brake for a second wheel on the first side of the vehicle, the third control signal configured to actuate the first solenoid of the second electropneumatic module; and,
transmitting a fourth control signal to the steering actuator wherein the fourth control signal is configured to cause rotation of the steering wheel during actuation of the first solenoid of the second electropneumatic module in the first rotational direction.

19. The method of claim 15 wherein the first control signal is generated by a brake controller, the second control signal is generated by a steering controller and further comprising the steps of:
establishing, in one of the brake controller and the steering controller, a first time for transmission of a corresponding one of the first and second control signals;
transmitting a synchronization request signal to another one of the brake controller and the steering controller;
receiving the synchronization request signal in the another one of the brake controller and the steering controller; and,
establishing, in the another one of the brake controller and the steering controller a second time for transmission of the other corresponding one of the first and second control signals
wherein the first and second times are synchronized to cause rotation of the steering wheel during actuation of the first solenoid of the first electropneumatic module.

20. The method of claim 15 wherein the first control signal is generated by a brake controller, the second control signal is generated by a steering controller and further comprising the step of transmitting, from one of the brake controller and the steering controller, a synchronization state signal to another one of the brake controller and the steering controller substantially contemporaneously with transmission of a corresponding one of the first and second control signals, the synchronization state signal causing the another one of the brake controller and the steering controller to generate the other of the corresponding one of the first and second control signals.

* * * * *